Figure 1:
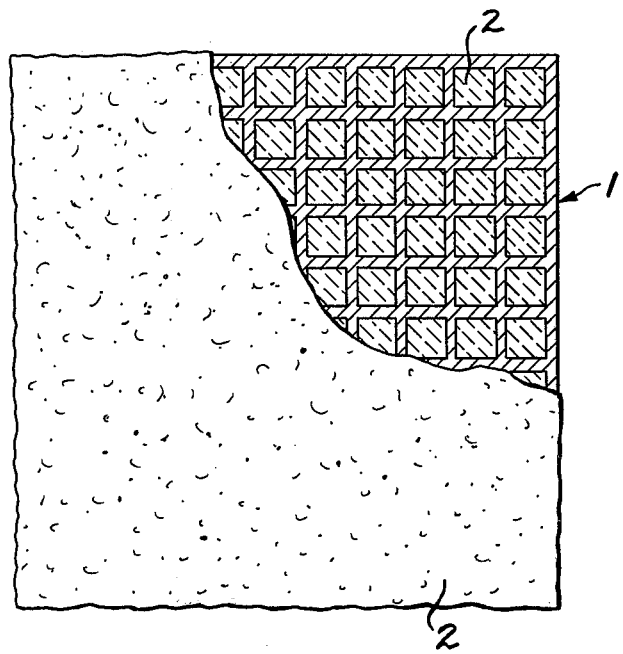

United States Patent [19]

Will

[11] 4,326,017
[45] Apr. 20, 1982

[54] POSITIVE ELECTRODE FOR LEAD ACID BATTERY

[75] Inventor: Fritz G. Will, Scotia, N.Y.

[73] Assignee: General Electric Company, Schenectady, N.Y.

[21] Appl. No.: 228,648

[22] Filed: Jan. 26, 1981

[51] Int. Cl.³ .............................................. H01M 4/56
[52] U.S. Cl. .................................... 429/228; 429/245
[58] Field of Search .............. 429/228, 245, 241, 225; 423/126.1, 126.3

[56] References Cited

U.S. PATENT DOCUMENTS 3,870,563  3/1975  Ruben ................................. 429/228
4,037,031  7/1977  Jacob ............................. 429/228 X Primary Examiner—Charles F. LeFevour
Attorney, Agent, or Firm—Jane M. Binkowski; James C. Davis, Jr.; Joseph T. Cohen

[57] ABSTRACT

A positive electrode for use in a lead-sulfuric acid electrolyte battery comprised of a grid supporting a layer of $PbO_2$, said grid being comprised of an electrically conducting substrate having an adherent, contacting, at least substantially pinhole-free coating of semiconducting metal oxide, the sulfuric acid electrolyte having no significant deleterious effect on the coating and forming a non-corroding oxide with the substrate at sites of pinholes.

9 Claims, 3 Drawing Figures

U.S. Patent   Apr. 20, 1982   4,326,017

POSITIVE ELECTRODE FOR LEAD ACID BATTERY

The present invention relates to a novel positive electrode for use in a secondary lead-sulfuric acid electrolyte storage cell or battery.

Today's Pb-sulfuric acid batteries use Pb or Pb-rich alloy grids as a conducting support for the active masses in both the positive and negative plates or electrodes. Two major problems attend the use of Pb grids: their large weight and their corrosion. These two features contribute to the known low specific energy and comparatively limited cycle life of Pb-acid batteries.

In a typical vehicle battery, the positive and the negative grid together constitute nearly 25% of the total battery weight. Two factors account for the large weight of the grids: the high resistivity of Pb (12 times that of Cu) necessitating the use of thicker grids, and to a lesser extent its high density (1.25 times that of Cu).

Furthermore, the Pb grid in the positive plate is thermodynamically unstable and corrodes by alternately forming on its surface a layer of $PbO_2$ during charging and of $PbSO_4$ during discharging. These layers are porous, have poor conduction and adherence and lead to a progressive deterioration of the Pb grid during cycling both in terms of the conductivity of the grid and the mechanical integrity of the whole plate.

Many attempts have been made to overcome these problems by replacing the Pb in the grid with other materials, but no successful solution has been identified as yet. Metals and alloys such as Ni, Nb, Ti, Ti-Mo-Zr alloy and Ti with a nitride layer have been explored as base materials for the positive grid. However, all of these either corrode or form passivating oxide films and have to be protected with a layer of Au. It has been found that even Au forms a passivating film which leads to a gradual performance degradation with cycling. Furthermore, the expense and rarity of Au render this approach unattractive.

This invention is directed to a positive electrode or plate having a Pb-free grid. The present grid with an electrical resistance equivalent to that of a conventional Pb alloy grid weighs significantly less than such conventional grid. Also, since the present grid is substantially corrosion free, it results in substantially longer battery life than attainable with the Pb alloy grid.

Briefly stated, the present positive electrode for use in a lead-sulfuric acid electrolyte cell or battery is comprised of a grid supporting an adherent layer of $PbO_2$, said grid being comprised of an electrically conducting substrate having an adherent, contacting, at least substantially pinhole-free, external coating of semiconducting metal oxide, said sulfuric acid electrolyte having no significant deleterious effect on the coating and forming a non-corroding oxide with the substrate at those few sites where pinholes might be present in the semiconductor oxide coating.

Figure 2:
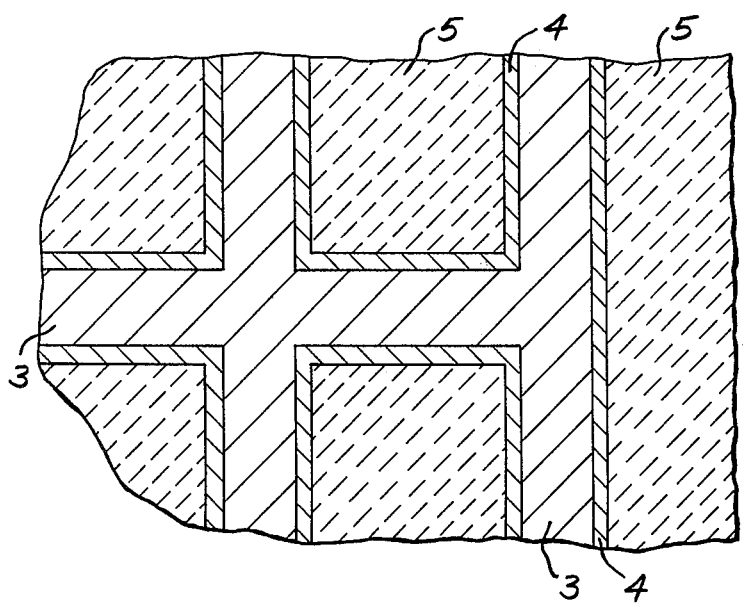
Figure 3:
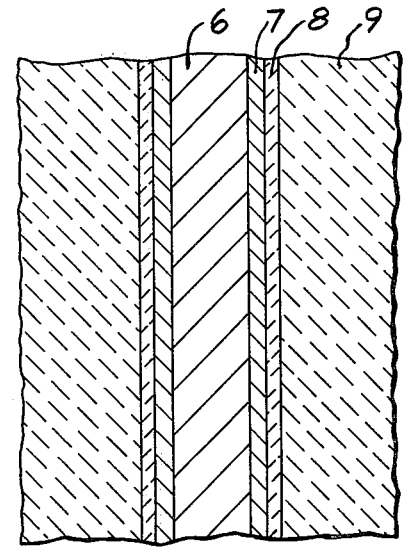

Those skilled in the art will gain a further and better understanding of the present invention from the detailed description set forth below, considered in conjunction with the figures accompanying and forming a part of the specification, in which:

FIG. 1 is a partially broken away view of an embodiment of the present electrode showing the present grid 1 in the form of a screen supporting a porous active layer mass 2 of $PbO_2$;

FIG. 2 is an enlarged cross-section of the electrode of FIG. 1 showing electrically conducting substrate 3, a coating of semiconducting metal oxide 4 and an adherent porous layer mass 5 of $PbO_2$; and FIG. 3 is an enlarged cross-section of the present positive electrode similar to FIG. 2 but comprised of an electrically conducting substrate 6, a coating of semiconducting metal oxide 7, an adherent layer 8 of $PbO_2$ which is significantly non-porous, and an adherent porous layer 9 of $PbO_2$.

The electrically conducting substrate of the present invention is one which forms a substantially non-corroding oxide on contact with sulfuric acid. Specifically, if the present substrate is exposed to the sulfuric acid electrolyte at the strongly oxidizing potential of the positive electrode, it will not be significantly deleteriously affected. An oxide forms in this case, which is not readily soluble in the sulfuric acid. The substrate has an electrical conductivity at room temperature (25° C.) sufficiently high for suitable operation of the electrode, and generally, such conductivity ranges from at least about $10^2 \text{ohm}^{-1} \text{cm}^{-1}$ up to about $10^6 \text{ohm}^{-1}$. Preferably, the substrate is selected from the group consisting of titanium, tin, niobium, tantalum, tungsten, molybdenum, zirconium, silicon and alloys thereof.

The form of the present substrate can vary depending on its application. Specifically, the size of the present substrate depends largely on the storage capacity of the battery. Generally, the thickness of the substrate ranges from about 0.01 millimeters up to about 10 millimeters, but more typically it ranges from about 0.5 millimeters to about 3 millimeters. The substrate, for example, can be in the form of a screen, a perforated foil, an expanded metal mesh, or a solid sheet. Preferably, the surface of the solid sheet is sufficiently rough or has protrusions to promote adherence of the layer of $PbO_2$. Also, the substrate should have at least sufficient mechanical strength to support the $PbO_2$ layer and also at least sufficient electrical conductivity to conduct current from the supported active porous $PbO_2$ material, i.e. the external layer in contact with the electrolyte, to the cell terminals without resulting in voltage losses in the substrate exceeding a few percent of the cell voltage.

Preferably, the substrate is cleaned to promote adhesion of the coating of semiconducting metal oxide to its surface. For example, it can be degreased by immersion in a suitable organic solvent, such as benzene or ethanol, and/or, it can be cleaned and etched by immersion in an acid such as hydrochloric acid.

The present coating of semiconducting metal oxide is in direct contact with the substrate, and it is free, or at least substantially free, of pinholes. This semiconducting metal oxide coating prevents contact, or significant contact, between the sulfuric acid electrolyte and the substrate. Any contact between electrolyte and substrate is substantially non-deleterious as it produces a substantially non-corroding oxide. Although such oxide usually has much lower conductivity than the semiconductor oxide coating, it does not impair the electrical conductivity of the substrate significantly as it will only be formed at the site of pinholes and the life of the present positive electrode would not be affected.

Under the operating conditions of the battery, the present coating of semiconducting metal oxide should not change significantly in form or composition, and it should not be significantly soluble in the sulfuric acid electrolyte. Specifically, the semiconducting coating should be at least substantially stable under the highly corrosive and oxidizing conditions of the positive $PbO_2$ plate, i.e. it should not be significantly deleteriously affected by the operating conditions of the battery. In addition, the semiconducting metal oxide coating should have an electrical conductivity at least sufficiently high at room temperature (25° C.) for suitable operation of the positive electrode, and generally, such conductivity ranges from at least about $10^{-5}$ ohm$^{-1}$ cm$^{-1}$ up to as high as possible, for example, $10^3$ ohm$^{-1}$ cm$^{-1}$, with the highest conductivity achievable being preferred.

The present semiconducting metal oxide coating can be composed of a doped or undoped semiconducting metal oxide, i.e., its semiconducting properties may be due, for example, to its intrinsic conductivity, or to a nonstoichiometry, or to a suitable dopant, or to a combination thereof. The semiconducting metal oxides of the highest valence states which are neither oxidizable nor readily reducible are preferred. Preferably, a suitable dopant, for example a metal oxide, is incorporated into the present semiconducting metal oxide by conventional techniques to increase its electrical conductivity. Metal ions having a valence lower than that of the metal ion component of the semiconducting oxide and anions such as fluoride ($F^-$) are useful as dopants.

Most preferably, the present semiconducting metal oxide is selected from the group consisting of $SnO_2$, $TiO_2$, $Ta_2O_5$, $Nb_2O_5$ and $WO_3$. These oxides are known to be nonstoichiometric and semiconducting, i.e. they usually contain lower oxides or a small excess of the component metal ions. Suitable doping of these semiconducting oxides often increases the magnitude of their electrical conductivity by many orders of magnitude. Antimony ions ($Sb^{+++}$) or fluoride ions ($F^-$) are especially useful dopants for $SnO_2$.

The coating of semiconducting oxide can be formed on the surface of the present substrate by a number of conventional techniques. Preferably, an organic solution of a thermally decomposable precursor of the semiconducting oxide along with any salt of the dopant or dopants, is sprayed onto the substrate. Spraying can be carried out with a spray gun which produces a very fine mist at elevated temperatures, typically ranging from about 250° C. to about 600° C., in air which results in a coating of the oxide or mixture of oxides on the substrate.

The present protective coating of semiconducting metal oxide covers at least that surface area of the substrate which is subject to contact with the electrolyte. The coating is at least sufficiently thick so that it is at least substantially free of pinholes. Generally, its thickness ranges from about 30 Angstroms to about 100,000 Angstroms (0.01 mm). Coatings thinner than 30 Angstroms are usually difficult to produce without significant pinholes. On the other hand, coatings significantly thicker than about 100,000 Angstroms may not be useful since they may tend to flake off. For best results, the present coating of semiconducting metal oxide has a thickness ranging from about 1,000 Angstroms to about 10,000 Angstroms.

As illustrated in FIGS. 1 and 2, the present grid is provided with an external layer of chemically active material, i.e. lead peroxide ($PbO_2$), which can be applied by a number of conventional techniques. For example, a layer of an aqueous-base lead oxide paste of desired viscosity can be applied to the grid by usual pasting techniques, dried in an environment of controlled humidity, immersed in dilute sulfuric acid, electrically oxidized to convert the layer to lead peroxide and washed with water to remove excess sulfuric acid. The final thickness of the external $PbO_2$ layer can vary and depends, as does the size of the grid, on the desired storage capacity of the battery. Generally, the thickness of the external active $PbO_2$ layer ranges from about 0.01 millimeter to about 10 millimeters depending largely on the thickness and form of the grid. The active material, i.e. the external layer of $PbO_2$, has some porosity resulting in a higher surface area exposed to the sulfuric acid electrolyte which enhances good electrode performance. Generally, it has a porosity ranging from about 20% by volume to about 80% by volume, and typically, from about 40% by volume to about 60% by volume. The present grid conducts current between the $PbO_2$ layer which it supports and the cell terminals which may be spot-welded or otherwise conductingly attached to the grid.

FIG. 3 shows an alternative embodiment of the present invention which is particularly desirable for operation of the positive electrode in a battery intended for use at high currents or high electric power levels. Specifically, FIG. 3 shows a continuous, intermediate layer 8 of $PbO_2$ which is non-porous, or which has no significant porosity, and an external porous layer 9 of $PbO_2$. Intermediate $PbO_2$ layer 8 is significantly more dense than the external active layer and reduces voltage losses significantly, i.e., the voltages at charge and discharge are improved significantly. Intermediate $PbO_2$ layer 8 is applied in a conventional manner, for example, by electrodeposition by making the present grid the positive electrode in a cell containing a divalent lead salt such as lead oxide (PbO) dissolved in 30% by weight perchloric acid and electrodepositing the $PbO_2$ layer thereon at a rate typically about 50,000 Angstroms per hour. Intermediate $PbO_2$ layer 8 need only have a thickness which makes it continuous. Typically, its density is about 90% of theoretical, and generally, its thickness ranges from about 1,000 Angstroms to about 200,000 Angstroms. The porosity of the active $PbO_2$ layer 9 is at least significant and depends largely on the application of the electrode. Generally, its porosity ranges from about 20% by volume to about 80% by volume, and typically its porosity ranges from about 40% by volume to about 60% by volume. High porosity is desirable for high current levels. Generally, $PbO_2$ layer 9 ranges in thickness from about 0.01 millimeter to about 10 millimeters, and its particular thickness depends largely on the thickness and form of the grid.

The invention is further illustrated by the following examples:

EXAMPLE 1

In this example, the substrate was an expanded screen of elemental titanium which measured 50 millimeters × 40 millimeters and had a thickness of 0.25 millimeter. The screen had an open area of approximately 50% by volume. A tab of titanium, 2 millimeters in width, was spot-welded to the titanium substrate to form a current collector lead. The substrate was degreased by immersion in a standard organic degreasing bath, washed with water and dried in air.

The substrate was then placed in an air oven at 400° to 600° C., supported by a plate made of glass or ceramic and sprayed with a spray gun for about 5 to 10 seconds with a fine mist consisting of a solution of 200 g. of $SnCl_4$ and 100 g. of $NH_4F$ in 1000 cc. of methyl alcohol. The spraying was interrupted sufficiently long for the temperature to recover to between 400° and 600° C., usually for about 1 minute, and then resumed again for 5 to 10 seconds followed by a 1 minute wait. The substrate was sprayed in this manner 10 to 20 times to build up a continuous adherent coating of fluoride-doped $SnO_2$ having a thickness of 1000 to 5000 Angstroms. All of the surface area of the substrate was covered with this coating which was examined under a microscope and determined to be significantly free of pinholes.

The coated substrate was then provided with a layer of significantly pinhole-free dense $PbO_2$ by deposition from an electrolytic bath. Specifically, the coated substrate was made the positive electrode in a glass beaker filled with an aqueous solution of one molar PbO dissolved in 3.6 molar $HClO_4$. Two foils of Pb, one facing one side and the other facing the opposite side of the substrate, served as the negative electrodes. A current of 40 mA was then passed through the cell for 1 and ½ hours. The coated substrate was then removed from the cell and examined. A thin continuous, adherent, significantly non-porous layer of $PbO_2$, about 0.007 millimeter thick, and having a density of 90% of the theoretical value covered substantially the entire surface area of the substrate.

A paste of active material, composed of 4.5 grams lead oxide (PbO), 0.4 cc. concentrated $H_2SO_4$ acid and about 0.3 cc. water, was applied to the resulting coated substrate to substantially completely cover the substrate. The pasted substrate was dried in air with approximately 50% relative humidity at room temperature overnight. The weight of the dried PbO paste was 3.8 grams, resulting in a theoretical capacity of 0.9 ampere hours.

The dried pasted electrode was freely suspended without the use of separators, in a glass cell containing sulfuric acid with sp.gr. 1.08 g/cc. and a negative lead electrode. It was charged with 45 milliamperes for 20 hours. This converted the PbO paste to active, porous $PbO_2$, producing the present positive electrode.

The electrolyte of the cell was then replaced with sulfuric acid with sp.gr. of 1.28 g/cc. The open circuit voltage of this cell was 2.14 volts. The present positive electrode was then extensively charge/discharge-cycled. Currents applied during charge and discharge varied between 15 milliamperes and 200 milliamperes.

The capacities recovered during discharge amounted to 36% for a current of 200 milliamperes and to 43% of theoretical capacity when discharged at a current of 50 milliamperes. Long-term cycling was then carried out with by charging and discharging with a current of 50 milliamps for 4 hours each. 100 such cycles were accumulated before the test was interrupted voluntarily. The charge and discharge voltages remained essentially constant during these 100 cycles. This demonstrates that no degradation of the present positive electrode took place over this period of time.

In contrast, a conventional positive $PbO_2$ electrode would have shown a noticeable deterioration in performance under these same conditions of cycling and with the electrode freely suspended in the electrolyte.

EXAMPLE 2

In this example, a positive electrode was prepared in the same manner as set forth in Example 1 except that the weight of the dried PbO paste amounted to 2.8 grams resulting in a theoretical capacity of 0.68 ampere hours.

This positive electrode was tested in a cell containing sulfuric acid electrolyte and a negative lead electrode, and it yielded a capacity of 38% of theoretical value when discharged with 200 milliamps as compared to 36% for the positive electrode of Example 1.

Long-term cycling of this positive electrode gave essentially the same favorable results as obtained for the positive electrode of Example 1.

EXAMPLE 3

The procedure used in this example was substantially the same as that set forth in Example 1 except that no intermediate $PbO_2$ layer was applied, and the solution was formed of 200 grams of $SnCl_4$, 100 grams of $Sb_2Cl_3$ in 1000 cc. of methyl alcohol. The resulting continuous semiconductive coating of Sb-doped $SnO_2$ was significantly non-porous and had a thickness of about 3000 Angstroms.

The PbO paste was applied directly to the $SnO_2$ coating and dried in air at room temperature.

After oxidizing the PbO paste to a porous active $PbO_2$ layer, in a manner substantially identical to that described in Example 1, a positive electrode with 0.71 ampere hours resulted. During repeated charging and discharging of this positive electrode with 10 milliamps for each 12 hours, 17% of the theoretical capacity was recovered. The charge voltage was found to be significantly larger and the discharge voltage significantly smaller than the corresponding voltages in Examples 1 and 2.

Ser. No. 228,647 filed of even date herewith in the name of Fritz Gustav Will entitled POSITIVE ELECTRODE FOR LEAD ACID BATTERY and assigned to the assignee hereof is incorporated herein by reference and discloses a positive electrode for use in a lead-sulfuric acid electrolyte battery comprised of a grid supporting an adherent external layer of $PbO_2$, said grid being comprised of an electrically conducting substrate having a protective pinhole-free shield of electrically conducting material, said shield being composed of a coating of semiconducting metal oxide, or a composite of at least a substantially pinhole-free external coating of semiconducting metal oxide and a pinhole-free coating of metal intermediate to the substrate and semiconducting oxide coating, said sulfuric acid electrolyte having a substantially deleterious effect on said substrate but having no significant deleterious effect on the shield.

What is claimed is:

1. A positive electrode for use in a secondary lead-sulfuric acid electrolyte cell or battery comprised of a grid supporting an adherent external layer of $PbO_2$, said grid being comprised of an electrically conducting substrate having an at least substantially pinhole-free coating of semiconducting metal oxide, the sulfuric acid electrolyte having no significant deleterious effect on the coating and forming a substantially non-corroding oxide with the substrate.

2. The positive electrode according to claim 1 wherein said substrate is selected from the group consisting of titanium, niobium, tantalum, tungsten, molybdenum, zirconium, silicon, tin and alloys thereof.

3. The positive electrode according to claim 1 wherein said semiconducting metal oxide is selected from the group consisting of $SnO_2$, $Nb_2O_5$, $TiO_2$, $Ta_2O_5$, and $WO_3$.

4. The positive electrode according to claim 1 wherein said substrate has an electrical conductivity at room temperature ranging from about $10^2$ ohm$^{-1}$ cm$^{-1}$ up to about $10^6$ ohm$^{-1}$ cm$^{-1}$, and said semiconducting metal oxide has a minimum electrical conductivity at room temperature of at least about $10^{-5}$ ohm$^{-1}$ cm$^{-1}$.

5. The positive electrode according to claim 1 wherein the thickness of said coating of semiconducting metal oxide ranges from about 30 Angstroms up to about 100,000 Angstroms.

6. The positive electrode according to claim 1 wherein said substrate has a thickness ranging from about 0.01 millimeter up to about 10 millimeters.

7. The positive electrode according to claim 1 wherein said external layer of $PbO_2$ is at least significantly porous and wherein there is a layer of $PbO_2$ intermediate to said coating of semiconducting metal oxide and said external layer of $PbO_2$, said intermediate layer of $PbO_2$ being at least significantly non-porous.

8. A positive electrode for use in a secondary lead-sulfuric acid electrolyte cell or battery comprised of a grid supporting an adherent external layer of $PbO_2$, said grid being comprised of a titanium substrate having an adherent at least substantially pin-hole free coating of stannic oxide.

9. The positive electrode according to claim 8 wherein said external layer of $PbO_2$ is at least significantly porous and wherein there is a layer of $PbO_2$ intermediate to said coating of stannic oxide and said external layer of $PbO_2$, said intermediate layer of $PbO_2$ being at least significantly non-porous.

* * * * *